US010615633B2

(12) United States Patent
Paatero et al.

(10) Patent No.: US 10,615,633 B2
(45) Date of Patent: Apr. 7, 2020

(54) POWER INSTALLATION WITH UPS

(71) Applicant: ABB Schweiz AG, Baden (CH)

(72) Inventors: Esa-Kai Paatero, Helsinki (FI); Nicola Notari, Gentilino (CH); Ivan Furlan, Brissago (CH)

(73) Assignee: ABB Schweiz AG, Baden (CH)

( * ) Notice: Subject to any disclaimer, the term of this patent is extended or adjusted under 35 U.S.C. 154(b) by 415 days.

(21) Appl. No.: 15/671,885

(22) Filed: Aug. 8, 2017

(65) Prior Publication Data
US 2018/0054084 A1 Feb. 22, 2018

(30) Foreign Application Priority Data

Aug. 8, 2016 (EP) .................................... 16183232

(51) Int. Cl.
*H02J 9/06* (2006.01)
*H02J 9/04* (2006.01)
*H02J 9/00* (2006.01)

(52) U.S. Cl.
CPC .................. *H02J 9/06* (2013.01); *H02J 9/00* (2013.01); *H02J 9/04* (2013.01)

(58) Field of Classification Search
CPC ................... H02J 9/02; H02J 9/04; H02J 9/06
See application file for complete search history.

(56) References Cited

U.S. PATENT DOCUMENTS 4,916,329 A * 4/1990 Dang ........................ G05F 1/24
307/66
5,371,666 A 12/1994 Miller
(Continued)

FOREIGN PATENT DOCUMENTS

| CN | 202634051 U | 12/2012 |
| WO | 2013101432 A2 | 7/2013 |

(Continued)

OTHER PUBLICATIONS

European Search Report, European Patent Application No. 16183232, dated Sep. 29, 2016, 4 pages.

*Primary Examiner* — Rexford N Barnie
*Assistant Examiner* — Terrence R Willoughby
(74) *Attorney, Agent, or Firm* — Taft Stettinius & Hollister LLP; J. Bruce Schelkopf

(57) ABSTRACT

The present application contemplates a power installation including an uninterruptible power supply system and a user installation, wherein the user installation includes a load, at least one AC power source, at least one secondary power supply, at least one controllable hardware component, and a system Protective Earth, the uninterruptible power supply system includes—at least one uninterruptible power supply module, and a control device for controlling the uninterruptible power supply system based on at least one system parameter of the uninterruptible power supply system, wherein the at least one uninterruptible power supply system is connected between the at least one AC power source, the at least one secondary power supply, and the load, the power installation further includes at least one installation control assembly including an assembly controller, and at least one measurement device connected to the assembly controller, wherein the installation control assembly is galvanically referenced to system Protective Earth, and the assembly controller performs a control of the uninterruptible power supply system and the at least one controllable hardware component based on measurement signals received from the at least one measurement device.

20 Claims, 12 Drawing Sheets

(56) References Cited

U.S. PATENT DOCUMENTS

| | | | | |
|---|---|---|---|---|
| 2008/0269953 A1* | 10/2008 | Steels | .................. | H02J 7/0004 |
| | | | | 700/295 |
| 2011/0278934 A1* | 11/2011 | Ghosh | ..................... | H02J 9/062 |
| | | | | 307/66 |
| 2012/0019070 A1* | 1/2012 | Matsuoka | ................. | G06F 1/30 |
| | | | | 307/64 |
| 2012/0205982 A1* | 8/2012 | Navarro | ................. | H02J 9/061 |
| | | | | 307/66 |
| 2015/0022002 A1* | 1/2015 | Agrawal | ................. | H02J 9/06 |
| | | | | 307/65 |
| 2015/0207362 A1* | 7/2015 | Ohnishi | ................. | H02J 9/062 |
| | | | | 307/65 |
| 2016/0241082 A1* | 8/2016 | Stoevring | ............... | H02J 9/062 |
| 2018/0309319 A1* | 10/2018 | Nakano | .................... | H02J 9/06 |

FOREIGN PATENT DOCUMENTS

| | | |
|---|---|---|
| WO | 2013101432 A3 | 7/2013 |
| WO | 2014105009 A1 | 7/2014 |

\* cited by examiner

POWER INSTALLATION WITH UPS

TECHNICAL FIELD

The present invention relates to the area of uninterruptible power supplies. In particular, the present invention relates to the area of power installations comprising a user installation and an uninterruptible power supply system.

BACKGROUND ART

In present power installations, a user installation is typically combines with an uninterruptible power supply (UPS) system, which is provided by a UPS manufacturer. In particular, retrofit applications of UPS systems to existing user installation can be required.

The user installation typically comprises a load, which has to be supplied with power. The load can be a single load or multiple individual loads, which can be considered as a single load from a system point of view. The load can be any kind of AC or DC load, or even a combination thereof. The user installation further comprises at least one AC power source, which is a primary power supply for powering the load. One or multiple AC power sources together form the primary power supply. The user installation still further comprises at least one secondary power supply, which provides power in case of a failure of the primary power supply. The user installation also comprises at least one controllable hardware component, e.g. switches or other components. A system Protective Earth is provided as a common Protective Earth for all components including the power sources and the load.

The uninterruptible power supply system comprises at least one uninterruptible power supply module, and a control device for controlling the uninterruptible power supply system based on at least one system parameter of the uninterruptible power supply system. Hence, the control device receives e.g. measured internal voltages and/or currents of the UPS system for powering the load from the primary and/or secondary power supply.

Static UPS systems, also referred to as solid state UPS systems, refer to UPS systems essentially without movable parts in its power path, in particular without a generator to provide power in case of a failure of the AC power source. Solid state UPS systems include architectures such as dual conversion or off-line, also known as single conversion.

Dual conversion is a very common design for static UPS, e.g. used in data centers. The UPS system comprises an AC/DC converter, also referred to as rectifier, which is provided at its power supply side and connected to the AC power source, a load side DC/AC converter, also referred to as inverter, which is connected to the load, and a DC/DC converter, also referred to as battery converter, which is typically connected to a battery as secondary power supply. The AC/DC converter, the DC/AC converter, and the DC/DC converter are connected to each other by a DC link. In normal operation, AC power from the AC power source is provided through the AC/DC converter and the DC/AC converter to the load. In case of a failure of the AC power source, the load is powered from the secondary power supply via the DC/DC converter and the DC/AC converter.

In single conversion UPS design, the load is directly connected to the AC power source via a power line. A DC/AC converter is typically connected between the power line and a battery as secondary power supply. Power is provided from the secondary power supply via the DC/AC converter in case of failure of the AC power source.

UPS control requirements and consequent built-in control capability usually support the minimum requirements of the basic installation type, based on a severe competition in the market setting stringent requirements on the cost of a standard high volume unit. Some excess capability is usually built in for minor flexibility, but this is not sufficient to support a major variability in system installation.

In this area, the power installation can be challenged by different installation types and/or national legal requirements depending on the place of the power installation.

Power installations typically conform to a few overall classes, TN-(C)-S and IT being the most common. AC power sources may include or be without neutral (N).

Installations that may be termed 'industrial', 'offshore' or 'marine' pose challenges to control of the UPS system. The installations typically have multiple additional transformers and controls/switch gears installed in no standard configuration. This requires additional, application specific sense capability for voltage/current and control capability to operate disconnect and other devices.

Some of the sense and control requirements will be crossing an isolation boundary (e.g. transformer primary and secondary sides) so require special consideration. The isolation requirements may be very severe, as an example a standard UPS is generally dimensioned for Overvoltage Category II (line transient level to expect) but an installation with heavy additional equipment may expect transients up to Category III or even IV.

Additional criteria may apply and a level of local or distributed decision making capability may be preferred or required.

Overall system reliability may require redundancy for critical functions, this may include measurement and communication.

All data has to be available on a relevant magnitude and time resolution for overall system control, usually but not always residing in the UPS system.

DISCLOSURE OF INVENTION

It is an object of the present invention to provide a power installation, which overcomes at least some of the above problems. In particular, it is an object of the present invention to provide a power installation comprising a user installation and an uninterruptible power supply system, which can be easily extended and provides an efficient means to control power supply to a load based on existing installations.

This object is achieved by the independent claims. Advantageous embodiments are given in the dependent claims.

In particular, the present invention provides a power installation comprising an uninterruptible power supply system and a user installation, wherein the user installation comprises a load, at least one AC power source, at least one secondary power supply, at least one controllable hardware component, and a system Protective Earth, the uninterruptible power supply system comprises at least one uninterruptible power supply module, and a control device for controlling the uninterruptible power supply system based at least one system parameter of the uninterruptible power supply system, wherein the at least one uninterruptible power supply system is connected between the at least one AC power source, the at least one secondary power supply, and the load, wherein the power installation further comprises at least one installation control assembly comprising an assembly controller, and at least one measurement device connected to the assembly controller, the installation control assembly is galvanically referenced to system Protective Earth, and the assembly controller performs a control of the uninterruptible power supply system and the at least one controllable hardware component based on measurement signals received from the at least one measurement device.

The basic idea of the invention is to provide an installation control assembly, which takes over control not only of the at least one controllable hardware component, but also of the uninterruptible power supply (UPS) system to perform a control of both. Accordingly, an existing UPS system based on standard components can be easily extended, so that an efficient control of the power installation can be performed. The UPS system can be easily modified to perform a desired control based on a control implemented in the assembly controller. Hence, major changes in the existing power installation, in particular in the UPS system can be avoided. Therefore, standard UPS systems can be used, whereby enhanced control can be provided. In particular, standard UPS components can be used and easily adapted to particular needs of a power installation by adaptation of control performed by the assembly controller.

The control of the power installation refers to a supervisory control of individual components. Hence, the assembly controller performs a supervisory control of the UPS system, whereby the UPS system is controlled by its own control device within control parameters provided by the assembly controller.

The installation control assembly itself may comprise a further control device, which is controlled by the assembly controller. Hence, the control of the at least one controllable hardware component can be provided by the control device using control parameters provided by the assembly controller. The control device may be part of a different component, e.g. the control device of the UPS system can act as control device of the at least one controllable hardware component. Hence, the control devices may share control responsibility for specific functionality with a set and predefined hierarchy. The installation control assembly may comprise at least some of the at least one controllable hardware component.

Based on the capabilities of the assembly controller, the installation control assembly can be extensively and freely configurable, e.g. in respect to analog sense capability, general purpose control capability with real/relevant time scale communication capability with the UPS system and back.

Obviously, the power installation comprises a communication link for communication between the at least one installation control assembly and the UPS system, in particular between the assembly controller and the control device of the UPS system. Any suitable communication link can be used, including wired and wireless links, which are known in the Art. The link can be an electronic or optical link. The communication link is preferably a bi-directional communication link.

The installation control assembly preferably supports galvanic isolation as required for analog inputs, e.g. measurement inputs or others. Hence, the installation control assembly is capable of functioning with the majority of conceivable power installation configurations.

The load has to be supplied with power. The load can be a single load or multiple individual loads, which can be considered as a single load from a system point of view. The load can be any kind of AC or DC load, or even a combination thereof. In case of an AC load, the load can be a 3- or 4-wire load without neutral or including neutral.

The at least one AC power source is a primary power supply for powering the load. One AC power source or multiple AC power sources together form the primary power supply. The AC power source typically comprises a connection to a power grid. The AC power source can be a 3- or 4-wire AC power source without neutral or including neutral.

The at least one secondary power supply provides power in case of a failure of the primary power supply. One secondary power supply or multiple secondary power supplies together form the secondary power supply. By way of example, the secondary power supply comprises a an alternative AC power source, a battery, a photovoltaic power source, or others. In case of an AC power source as secondary power supply, the secondary power supply can be a 3- or 4-wire AC power source without neutral or including neutral. In some cases, the secondary power supply is part of the UPS system.

The at least one controllable hardware component may comprise e.g. switches or other components. The at least one controllable hardware component is typically controlled directly by the assembly controller. However, the at least one controllable hardware component can also be controlled by an individual control device, which is controlled by the assembly controller.

The installation control assembly refers to an assembly, which can have a functional task, e.g. battery management, temperature management, or others. Alternatively, the installation control assembly may include an assembly of unconnected functions, which are controlled by the assembly controller. The system Protective Earth is provided as a common Protective Earth for all components including the power sources and the load.

The at least one uninterruptible power supply module is typically a standard UPS module, which are used in UPS systems in parallel for scaling the UPS system to customer needs. The UPS modules can be grouped in racks to form bigger units. However, the term UPS module here includes individual installations of a UPS, which do not refer to such standard modules, but which provide a similar functionality.

The control device controls the uninterruptible power supply system based on at least one system parameter of the uninterruptible power supply system. Hence, the control device receives e.g. measured internal voltages and/or currents of the UPS system for powering the load from the primary and/or secondary power supply. The control device can be an individual control device of the UPS system, or a control unit of the UPS module, which performs the control of the UPS system. In case of multiple UPS modules, the control device commonly controls the multiple UPS modules. In this case, a control unit of one of the UPS modules performs the control of the UPS system. Alternatively, the control units of multiple or all UPS modules commonly perform the control of the UPS system. Each control unit always controls its respective UPS module.

Reliable control of the power installation, and the UPS system in particular, preferably has a reference, which is preferably tied to a potential that is stable vs. all voltage measurements, e.g. Protective Earth. The voltage measurements for simplicity often are galvanic (resistive) for both AC and DC.

The present invention refers to any kind of UPS systems, in particular to static or solid state UPS systems, which refer to UPS systems essentially without movable parts in its power path, in particular without a generator to provide power in case of a failure of the AC power source. Solid state UPS systems include architectures such as dual conversion or off-line, also known as single conversion.

Dual conversion is a very common design for static UPS, e.g. used in data centers. The UPS system comprises an AC/DC converter, also referred to as rectifier, which is provided at its power supply side and connected to the AC power source, a load side DC/AC converter, also referred to as inverter, which is connected to the load, and a DC/DC converter, also referred to as battery converter, which is typically connected to a battery as secondary power supply. The AC/DC converter, the DC/AC converter, and the DC/DC converter are connected to each other by a DC link. In normal operation, AC power from the AC power source is provided through the AC/DC converter and the DC/AC converter to the load. In case of a failure of the AC power source, the load is powered from the secondary power supply via the DC/DC converter and the DC/AC converter.

In single conversion UPS design, the load is directly connected to the AC power source via a power line. A DC/AC converter is typically connected between the power line and a battery as secondary power supply. Power is provided from the secondary power supply via the DC/AC converter in case of failure of the AC power source.

According to a modified embodiment of the invention the installation control assembly comprises at least one out of a control input and a control output for receiving control signals and for transmitting control signals, respectively. The control inputs/outputs enable reception of control signals. The control signals can be received or transmitted as analog or digital signals. The control signals can be received at the input from any kind of sensing device or other control devices/assembly controllers. The control signals can be provided at the control output to any kind of sensing device or other control devices/assembly controllers.

According to a modified embodiment of the invention the control inputs and control outputs are isolated, non-isolated or a combination thereof. Isolation of control inputs/outputs refers to a galvanic separation. Galvanic separation can be achieved e.g. by providing transformers or other components, which achieve a galvanic separation. The galvanic separation can be provided directly at the control input/output or at a distant location.

According to a modified embodiment of the invention the at least one measurement device is a measurement device for at least one out of voltage, current, temperature, mass flow or others. Depending on the control to be performed by the assembly controller and depending on the type of controllable hardware component, different information can be required. Voltages and/or currents can be measured at a power supply side of the UPS system and/or at a load side of the UPS system. A mass flow can refer e.g. to information regarding heat circulation within the power installation or of a cooling device.

According to a modified embodiment of the invention the power installation comprises multiple installation control assemblies forming an installation control assembly system, wherein the assembly controllers of the installation control assembly system perform a common control of the uninterruptible power supply system and the at least one controllable hardware component. Preferably, each installation control assembly has a dedicated control task, e.g. battery management, temperature management, or others, which are performed by a control device of the respective installation control assembly, whereby overall control is commonly performed. By adding further installation control assemblies, functionality of the power installation can be easily increased.

According to a modified embodiment of the invention the assembly controllers of the installation control assembly system operate on a master/slave or a distributed and redundant control architecture. Accordingly, one assembly controller or a group of assembly controllers can act as master, which control(s) assembly controllers of other installation control assemblies, which act as slave. The control is typically a supervisory control, so that assembly controllers of slave installation control assemblies perform control within parameters defined by the master assembly controller(s). Alternatively, the assembly controllers enable a common control of the installation control assembly system.

According to a modified embodiment of the invention the installation control assembly system comprises an independent assembly controller controlling the uninterruptible power supply system and the at least one controllable hardware component. The independent assembly controller is then typically provided as a master for other assembly controllers, which are provided as part of an installation control assembly.

According to a modified embodiment of the invention the assembly controller performs a control of the uninterruptible power supply system and the at least one controllable hardware component with a choice of power source according to a defined preference. The power installation may have different power sources, which can be primary or secondary power supplies. Hence, based on a preference, a suitable power source can be selected. E.g. when the power installation comprises a regenerative power source, e.g. a wind turbine or photovoltaic cells, a maximum power available from these regenerative power sources can be to power the load, and the AC power source can be used to provide additional power as required to sufficiently power the load. In case e.g. of a failure of the primary power supply, secondary power supply like batteries and regenerative power sources can be used upon availability, e.g. upon charge status of the battery or power available from the regenerative power source based on environmental condition like wind and sun conditions.

Furthermore, a power management can be performed e.g. to charge the battery as secondary power supply from a regenerative power source upon availability, e.g. based on environmental conditions.

According to a modified embodiment of the invention the assembly controller implements a control of the uninterruptible power supply system and the at least one controllable hardware component with a choice of power source according to at least one out of power installation efficiency optimization, power source current Power Factor (PF), power source quality, availability of regenerative power sources as secondary power supplies, and a user controlled preference of power sources.

According to a modified embodiment of the invention the installation control assembly implements a control, communication and measurement capability for the uninterruptible power supply system beyond the inherent control capability of the uninterruptible power supply system. Hence, the installation control assembly implements enhances the capabilities compared to the capabilities enabled by the UPS system alone. In particular, the assembly controller can provide additional measurement values, which are not under control and therefore not available to the UPS system, which can be used for control. Also the control can be enhanced, since additional control options can be provided depending on the controllable hardware component. Communication capabilities can be provided by the installation control assembly, e.g. for receiving additional measurement values from different sensors.

According to a modified embodiment of the invention the load comprises a specification of at least one out of a load voltage, a load current and a load frequency, whereby the assembly controller performs a control of the uninterruptible power supply system and the at least one controllable hardware component based on the specification of at least one out of a load voltage, a load current and a load frequency. The specification can be verified directly at the load by use of suitable sensors. Preferably, the specification comprises a margin. Further preferred, the margin can be set by an operator.

According to a modified embodiment of the invention the at least one controllable hardware component comprises at least one out of a switch gear, components for thermal management, in particular of the uninterruptible power supply system, an additionally isolated control interface, and self-contained assemblies in communication with the uninterruptible power supply system. The switch gear may comprise any suitable switching equipment. Components for thermal management may comprise fans, ventilators, air conditioning system or any other circulation of a coolant. The isolated control interface can be any suitable user interface, which is galvanically isolated from the installation control assembly.

According to a modified embodiment of the invention at least one out of the installation control assembly, the control device, and a communication system for communication of the installation control assembly and the control device comprises a user interface enabling safe access by a system operator. The user interface preferably tied to a access reference and at a voltage level safe to touch without added precautions. This usually is the enclosure at Ground/PE. In case of the installation control assembly, the assembly controller can be provided with the user interface. However, the user interface and the assembly controller can be locally separated. Also in the case of the User interface provided at the UPS system, the control device can be locally separated from the control device. The user interface enables modification of control of the assembly controller. Additionally, the user interface can be provided as a single user interface for the entire power installation, thereby enabling modification of multiple or all of the assembly controllers, control device, and control units.

According to a modified embodiment of the invention the uninterruptible power supply system comprises multiple uninterruptible power supply modules, which are connected in parallel within the uninterruptible power supply system. The UPS modules are typically standard UPS modules, which are used in UPS systems in parallel for scaling the UPS system to customer needs. The UPS modules can be grouped in racks to form bigger units. The UPS modules are typically connected to a common AC source as primary power supply via a power bus and to a common load via a load bus. The UPS modules are interconnected via a communication bus and are commonly controlled.

According to a modified embodiment of the invention each uninterruptible power supply module comprises a control unit, whereby the control units are in communication with each other, and at least one out of the control units implements the control device of the uninterruptible power supply system and commonly control the multiple uninterruptible power supply modules.

BRIEF DESCRIPTION OF DRAWINGS

These and other aspects of the invention will be apparent from and elucidated with reference to the embodiments described hereinafter.

In the drawings.

DETAILED DESCRIPTION OF THE INVENTION

Figure 1:
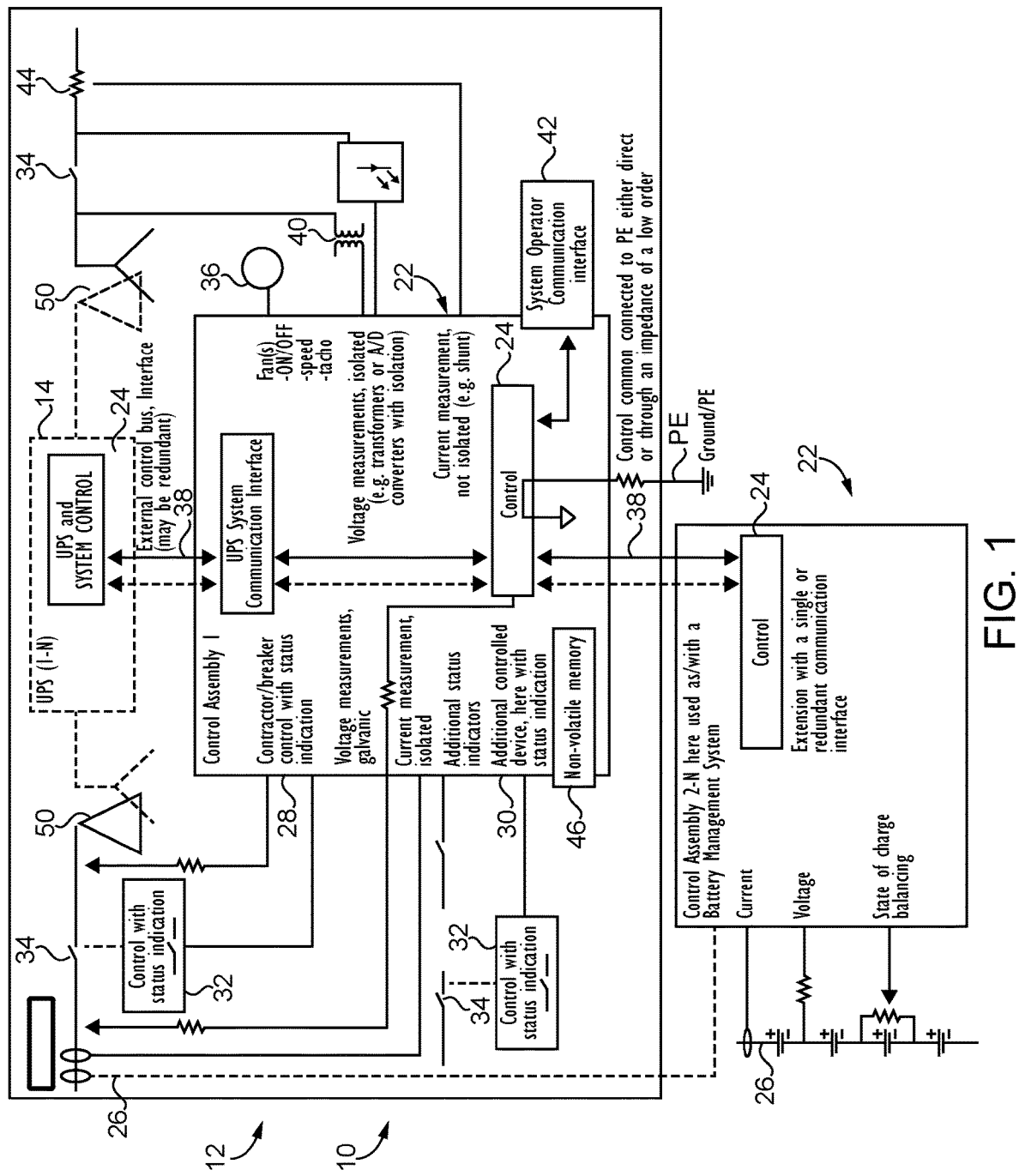
FIG. 1 shows a power installation comprising an uninterruptible power supply system and a user installation according to a first, preferred embodiment as a schematic view.
Figure 2:
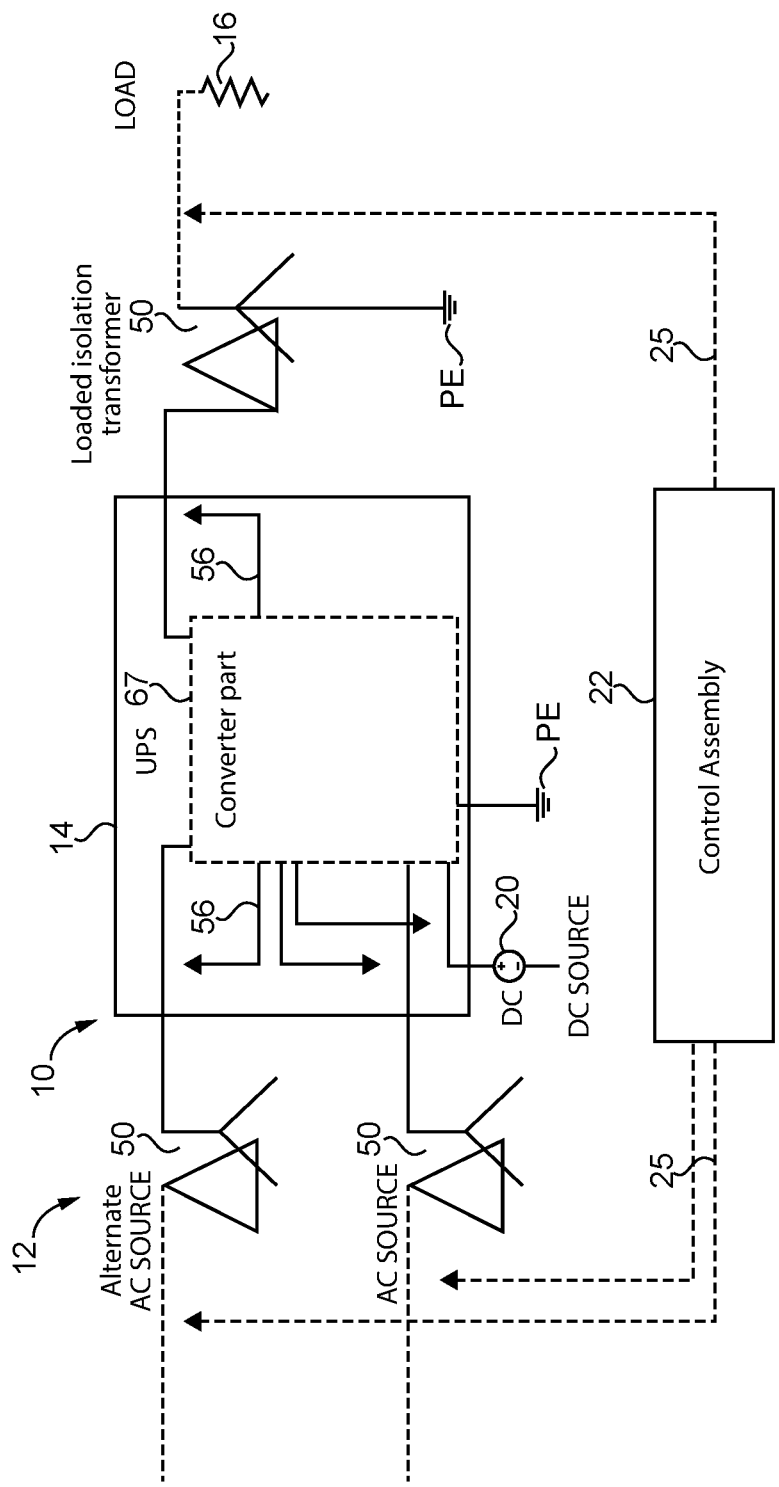
FIG. 2 shows the power installation in accordance with the first embodiment with comprising an uninterruptible power supply system with multiple measurement devices as a schematic view.
Figure 3:
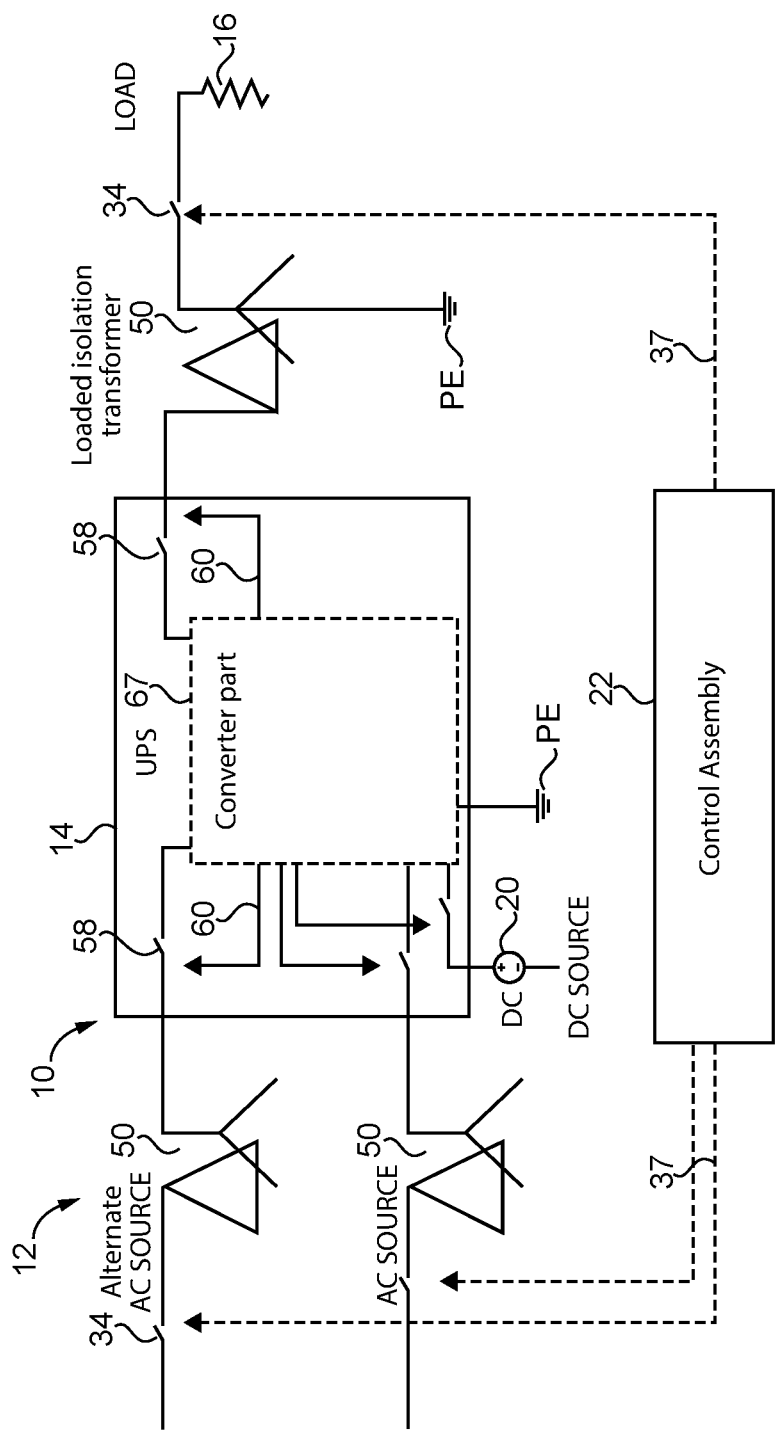
FIG. 3 shows the power installation in accordance with the first embodiment with comprising an uninterruptible power supply system with multiple controllable hardware components as a schematic view.

FIGS. 1 to 3 show a power installation 10 comprising an uninterruptible power supply (UPS) system 12 and a user installation 14 according to a first, preferred embodiment. FIGS. 1 to 3 refer to the same embodiment, but show different details of the power installation 10.

In general, any kind of UPS system 12 can be used. In this embodiment, the UPS system 12 is a static or solid state UPS systems with dual conversion. Details will be given below.

The user installation 14 comprises a load 16 and an AC power source 18 as primary power supply. The user installation 14 further comprises a secondary power supply 20, which is a battery in this embodiment. The user installation 14 still further comprises a system Protective Earth PE. All components of the user installation 14 and the UPS system 12 are referenced to system Protective Earth PE.

The power installation 10 further comprises two installation control assemblies 22. Each installation control assembly 22 comprises an assembly controller 24, and at least one measurement device 26, which is connected to the assembly controller 24. The assembly controller 24 is connected to a non-volatile memory 46, which e.g. stores a log of operation history and events. Furthermore, the non-volatile memory 46 may store control parameters of the power installation 10 in general and the assembly controller 24 in particular. The non-volatile memory 46 may be an easily removable part (e.g. mounted on a connector) or an integral part of the assembly controller 24.

Figure 7:
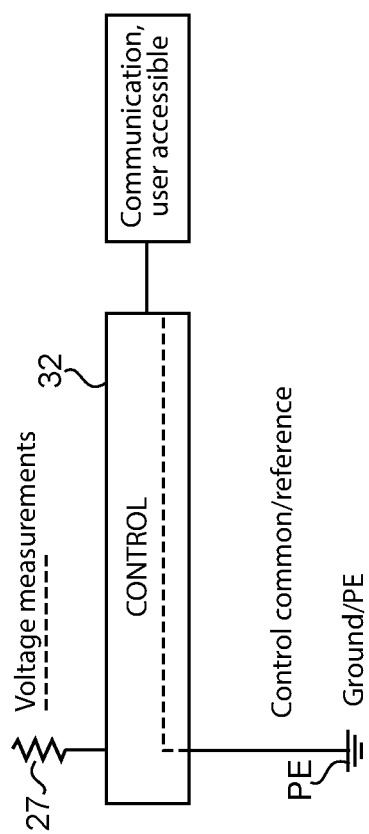
FIG. 7 shows a measurement device of the power installation of the first embodiment in detail as a schematic view.

The measurement device 26 is a measurement device for a current in this embodiment. Other measurement devices 26 are used for measuring voltage, temperature, mass flow or others. A general measurement device 26 can be seen in FIG. 7, comprising a controller 32 and a probe 27. The measurement device 26 is connected to protective earth PE.

The installation control assemblies 22 each comprise control inputs 28 and control outputs 30 for receiving control signals and for transmitting control signals, respectively. The installation control assembly 22 supports galvanic isolation for analog inputs. One of the control inputs 28 is connected by way of example to a shunt 44 for current measurement.

The control outputs 30 in this embodiment are connected to controllers 32 for controlling different devices, in particular different controllable hardware components 34, 36. The control inputs 28 and control outputs 30 are isolated, non-isolated or a combination thereof. Isolation or galvanic separation is achieved e.g. by providing transformers, i.e. a galvanic separation transformer 40, or other suitable components.

The installation control assemblies 22 comprise in this embodiment different switches 34. One of the installation control assemblies 22 comprises a fan 36, which provide fresh air for cooling the UPS system 12 in this embodiment. The switches 34 and the fan 36 are controllable hardware components. The controllable hardware components 34, 36 are controlled directly by the respective assembly controller 24.

The power installation 10 further comprises a communication link 38 for communication between the installation control assemblies 22 and the UPS system 12, in particular between the assembly controllers and the control device of the UPS system. The communication link 38 is a wired, electronic, bi-directional communication link in this embodiment.

The power installation 10 still further comprises a user interface 42 enabling safe access by a system operator. The user interface 42 is provided in this embodiment as part of one installation control assembly 22.

The UPS system 12 in this embodiment refers to a dual conversion UPS and is connected between the AC power source 18, the secondary power supply 20, and the load 16. The connections between the AC power source 18 and the load 16 each comprise a transformer 50.

The UPS system 14 of the first embodiment comprises one UPS module 52, and a control device 54 for controlling the UPS system 12 based on system parameters of the UPS system 12. Hence, the control device 54 receives e.g. measured internal voltages and/or currents of the UPS system 12, as indicated by arrows 56 in FIG. 2, and performs a control of e.g. UPS internal switches 58, as indicated by arrows 60 in FIG. 3. As can be seen in FIG. 1, in particular the control device 54 is connected to the assembly controller 24 by means of the communication link 38.

Figure 4:
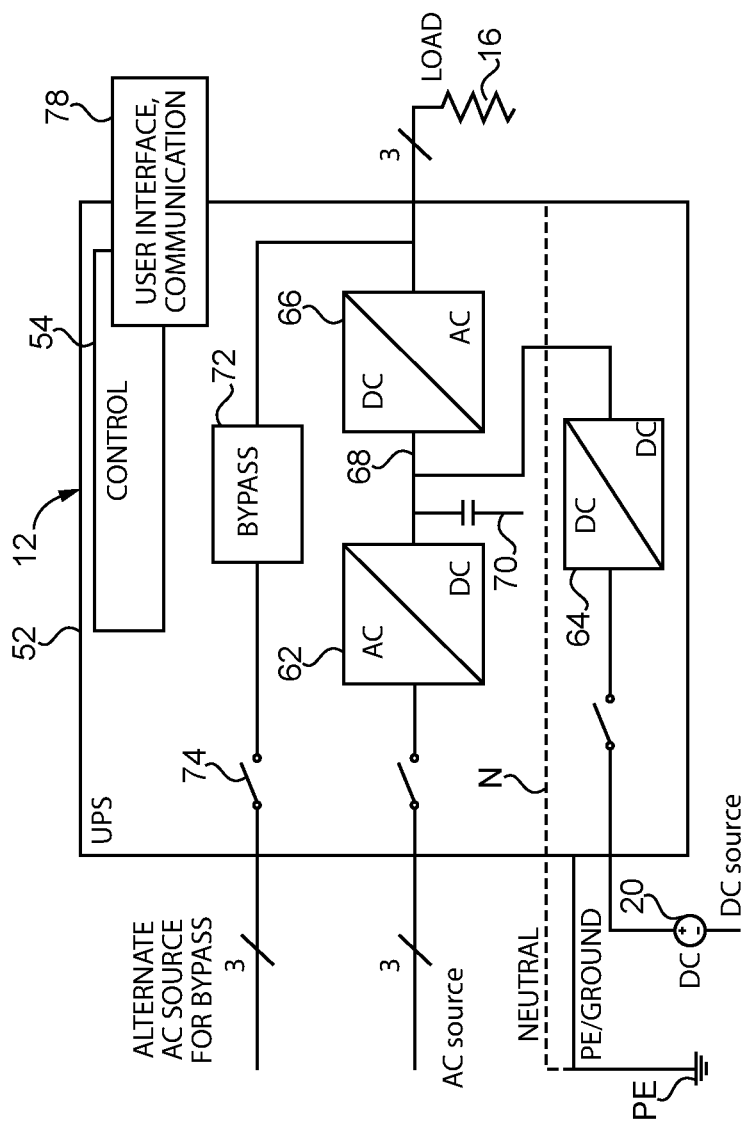
FIG. 4 shows a UPS system according to a second embodiment in accordance with the power installation of the first embodiment as a schematic view.

A UPS system 12 according to a second embodiment can be seen in FIG. 4. The UPS system 12 of the second embodiment is provided for use in the power installation 10 of the first embodiment and is formed by a single UPS module 52.

The UPS module 52 comprises an AC/DC converter 62, also referred to as rectifier, which is connected to the AC power source 18 to receive AC power, a DC/DC converter 64, which is connected to the battery 20 to receive DC power, and a DC/AC converter 66, also referred to as inverter, which is connected to the load 16. The AC/DC converter 62, the DC/DC converter 64, and the DC/AC converter 66 are interconnected by a DC link 68. The DC link 68 comprises a storage capacitor 70 for buffering. In case of a DC load, instead of the DC/AC converter 66, a further DC/DC converter can be used to power the load 16. In some figures, instead of the individual components, a converter part 67 is shown, which comprises the AC/DC converter 62, the DC/DC converter 64, the DC/AC converter 66, the DC link 68, and the storage capacitor 70. The UPS module 52 is connected to Neutral N. Hence, the shown UPS system 12 refers to a TN-S, grounded 5-wire installation with Neutral N and Ground PE routed as separate conductors. Other solutions are possible, e.g. TN-C or IT. Neutral N is not necessarily present.

In case of failures on a side of the load 16, e.g. a short circuit, it can be required to provide a current to the load 16, which is sufficient to trigger load side protection means, since the current through the DC/AC converter 62 is limited based on its semiconductor components. This is typically achieved by a bypass connection 72, which is provided with a bypass switch 74. The bypass connection 72 is connected to an alternate AC power source 76, which provides a current to the load 24 in case of failure to trigger protection means at a load side of the UPS system 12 and to clear the fault.

Furthermore, the UPS system 12 of the first embodiment comprises an additional user interface and a communication interface, which are depicted together as component 78 in FIG. 4. The communication interface is connected to the communication link 38.

The control device 54 controls all components of the UPS system 12 according to its control parameters and as specified for powering the load 16 from the primary and/or secondary power supply 18, 20. Hence, the load is typically powered by the primary power supply. The battery 20 provides power to the load in case of a failure of the primary power supply 18.

Figure 5:
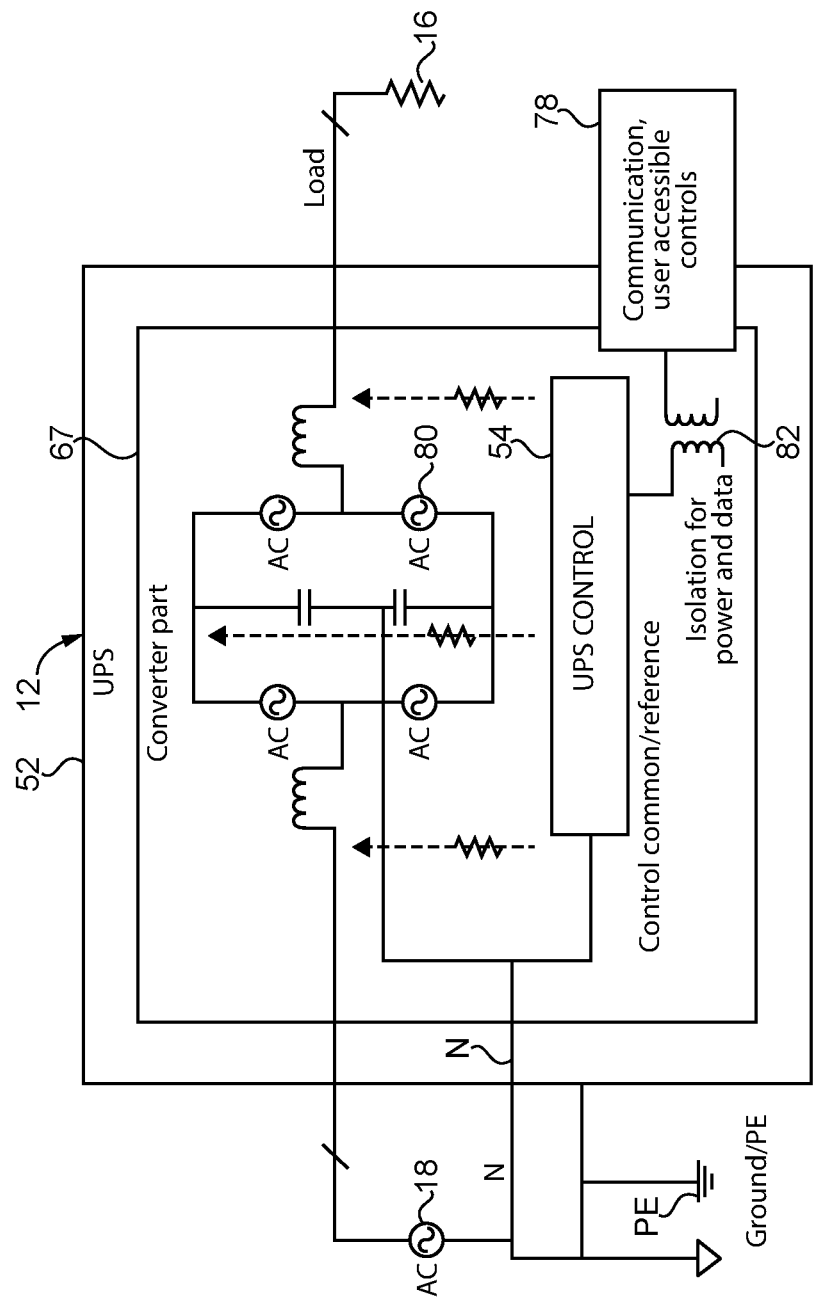
FIG. 5 shows a UPS system according to a third embodiment in accordance with the power installation of the first embodiment as a schematic view.

A UPS system 12 according to a third embodiment is shown in FIG. 5. The UPS system 12 of the third embodiment is provided for use in the power installation 10 of the first embodiment.

Although the converter part 67 is depicted in a different way as having multiple internal power sources 80, the UPS system 12 of the second and third embodiment are almost identical, in particular in respect to the converter part 67. For the sake of simplicity, some components of the UPS system 12 according to a third embodiment are omitted in FIG. 5. As can be seen in FIG. 5, the UPS system 12 of the third embodiment comprises an isolation transformer 82 provided between the control device 54 and the component 78 with the user interface and the communication interface.

Figure 6:
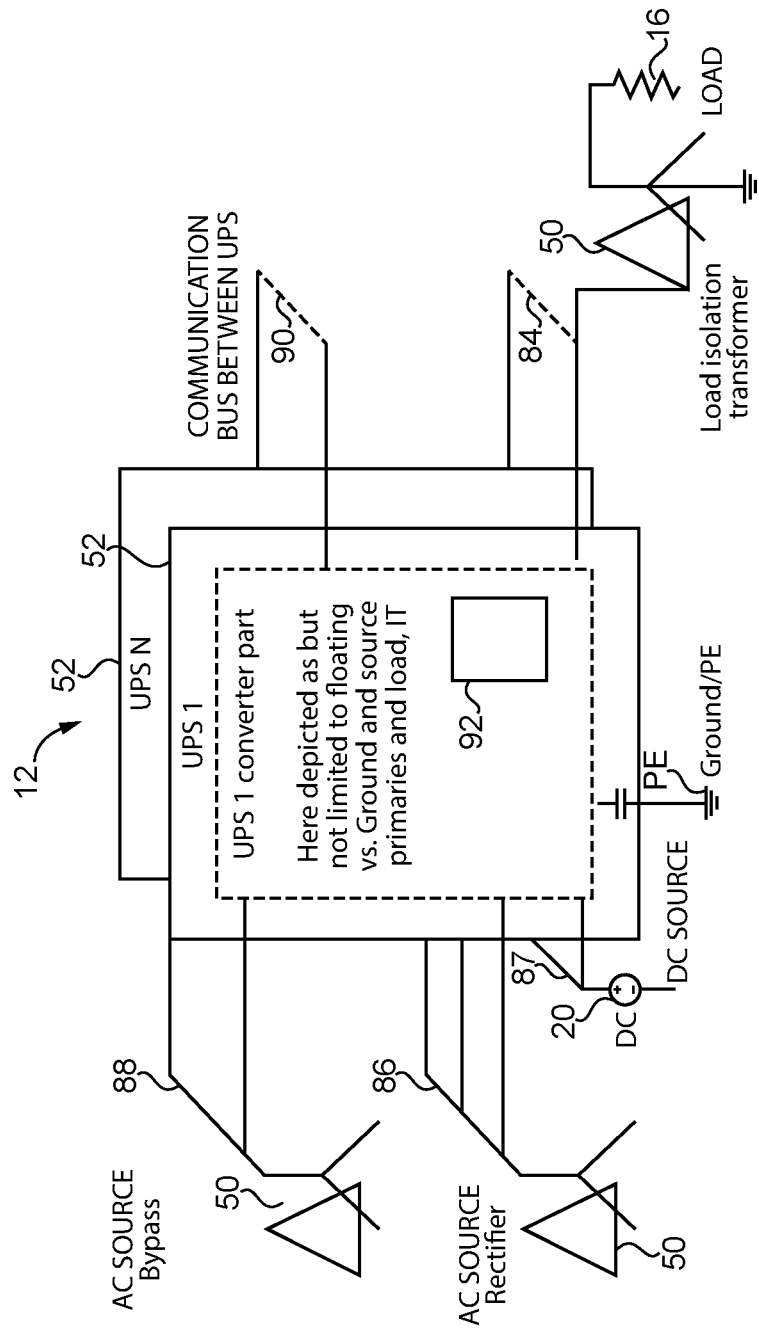
FIG. 6 shows a UPS system according to a fourth embodiment in accordance with the power installation of the first embodiment as a schematic view.

A UPS system 12 according to a fourth embodiment is shown in FIG. 6. The UPS system 12 of the fourth embodiment is provided for use in the power installation 10 of the first embodiment. The UPS system 12 of the fourth embodiment comprises multiple UPS modules 52. Each UPS module 52 can have a configuration as described above with respect to the second or third embodiment.

As can be further seen in FIG. 6, the individual UPS modules 52 are commonly connected to the load 16, the primary power supply 18, and the alternate AC power source 76 by a load side power bus 84, a power supply side primary power bus 86, a power supply side secondary power bus 87, and a bypass power bus 88. Furthermore, the individual UPS modules 52 are interconnected by a control link 90 to provide a communication connection between control units 92 of the UPS modules 52.

The power supply modules 52 are a standard UPS modules 52, which are connected in the UPS system 12 in parallel. Depending on the number of UPS modules 52, the UPS system 12 can be scaled to customer needs. The UPS modules 52 are in a way not explicitly shown in the figures grouped in racks to form bigger units.

The control device 54 according to the fourth embodiment is represented by a control unit 92 of one of the UPS modules 52, which performs the control of the UPS system 12. Hence, the UPS modules 52 are commonly controlled by the control unit 92 representing the control device 54.

The UPS system 12 is connected with transformers 50 to the AC power source 18, the alternative power supply 76, and the load 16 providing a galvanic isolation. Isolation can be applied e.g. for voltage matching, avoidance of current and ground loops, interference suppression, common mode suppression, fault limiting, or others. Grounding can be provided on either primary and/or secondary side of the transformer 50, according to specific installation requirements. In the embodiment shown in FIG. 6, the load 16 is locally grounded.

Based on the above described configurations, the assembly controller 24 performs a control of the power installation 10, i.e. the uninterruptible power supply system 12 and the controllable hardware components 34, 36 based on measurement signals received from the measurement devices 26. Measurement signals received at the assembly controller 24 from the measurement devices 26 are indicated by arrows 25 in FIG. 2. A control of the controllable hardware components 34, 36 by the assembly controller 24 is indicated by arrows 37 in FIG. 3.

The control of the power installation 10 refers to a supervisory control of its individual components. Hence, the assembly controller 24 performs a supervisory control of the UPS system 12, whereby the UPS system 12 is controlled by its own control device 54 within control parameters provided by the assembly controller 24.

The two installation control assemblies 22 together form an installation control assembly system 98, wherein the assembly controllers 24 perform a common control of the UPS system 12 and the controllable hardware components 34, 36. Each installation control assembly may have a dedicated control task, e.g. battery management, temperature management, or others, which are performed by a control device (not shown) of the respective installation control assembly 22, whereby overall control of the power installation 10 is commonly performed. In this embodiment, the assembly controllers 24 of the installation control assembly system 98 operate on a master/slave control architecture. Accordingly, one assembly controller 24 acts as master, which controls the assembly controller 24 of the other installation control assembly 22, which acts as slave. The control is a supervisory control, so that assembly controllers 24 of slave installation control assemblies perform control within parameters defined by the master assembly controller 24.

Figure 8:
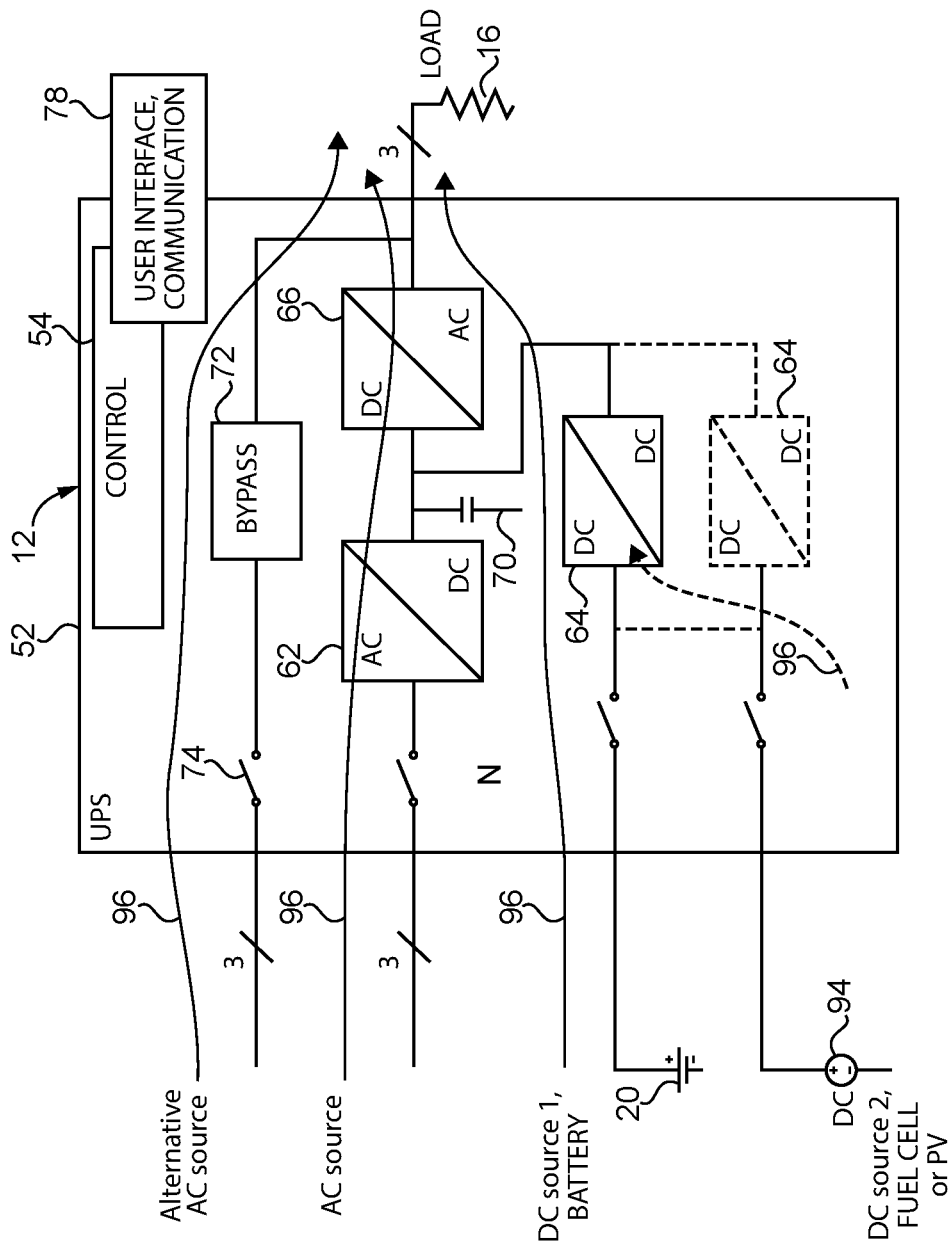
FIG. 8 shows a power installation according to a fifth embodiment with different power paths as a schematic view.

In particular, the assembly controller 24 performs a control of the UPS system 12 and the controllable hardware components 34, 36 with a choice of power source according to a defined preference. Hence, as can be seen in FIG. 8, which refers to a fifth embodiment of a power installation 10, the UPS system 12 of the fifth embodiment is based on the UPS system 12 of the second embodiment. Hence, in addition, the power installation 10 of the fifth embodiment comprises a fuel cell or photovoltaic power supply 94 as further secondary supply. The fuel cell or photovoltaic power supply 94 can be connected with a proprietary DC/DC converter 64 to the DC link 68, or the fuel cell or photovoltaic power supply 94 shares a DC/DC converter 64 with the battery 20, as indicated by the dashed lines.

A suitable power supply is selected, e.g. based on a preference. Different power paths are indicated by arrows 96 in FIG. 8. In particular, a maximum power available from the fuel cell or photovoltaic power source 94, which is a regenerative power supply, can be used to power the load 16, and the AC power source 18 can be used to provide additional power as required to sufficiently power the load 16. In case e.g. of a failure of the AC power source, one of the battery 20 and the fuel cell or photovoltaic power supply 94 can be used upon availability, e.g. upon charge status of the battery 20 or power available from the fuel cell or photovoltaic power supply 94, based on environmental conditions like wind and sun.

Further considerations for a choice of power source may be availability, environmental values, operating cost or other criteria. The bypass connection 72 and/or the converter part 67 may operate in parallel and supply a part of a required power of the load 16. E.g. robust bypass via the bypass connection 72 may be the preferred power source on a cloudy day ('eco-mode') due to an overall efficiency higher than through the converters 62, 64, 66. Battery depletion usually is the last resort due to a limited energy content and poor long term cycling capabilities.

Figure 9:
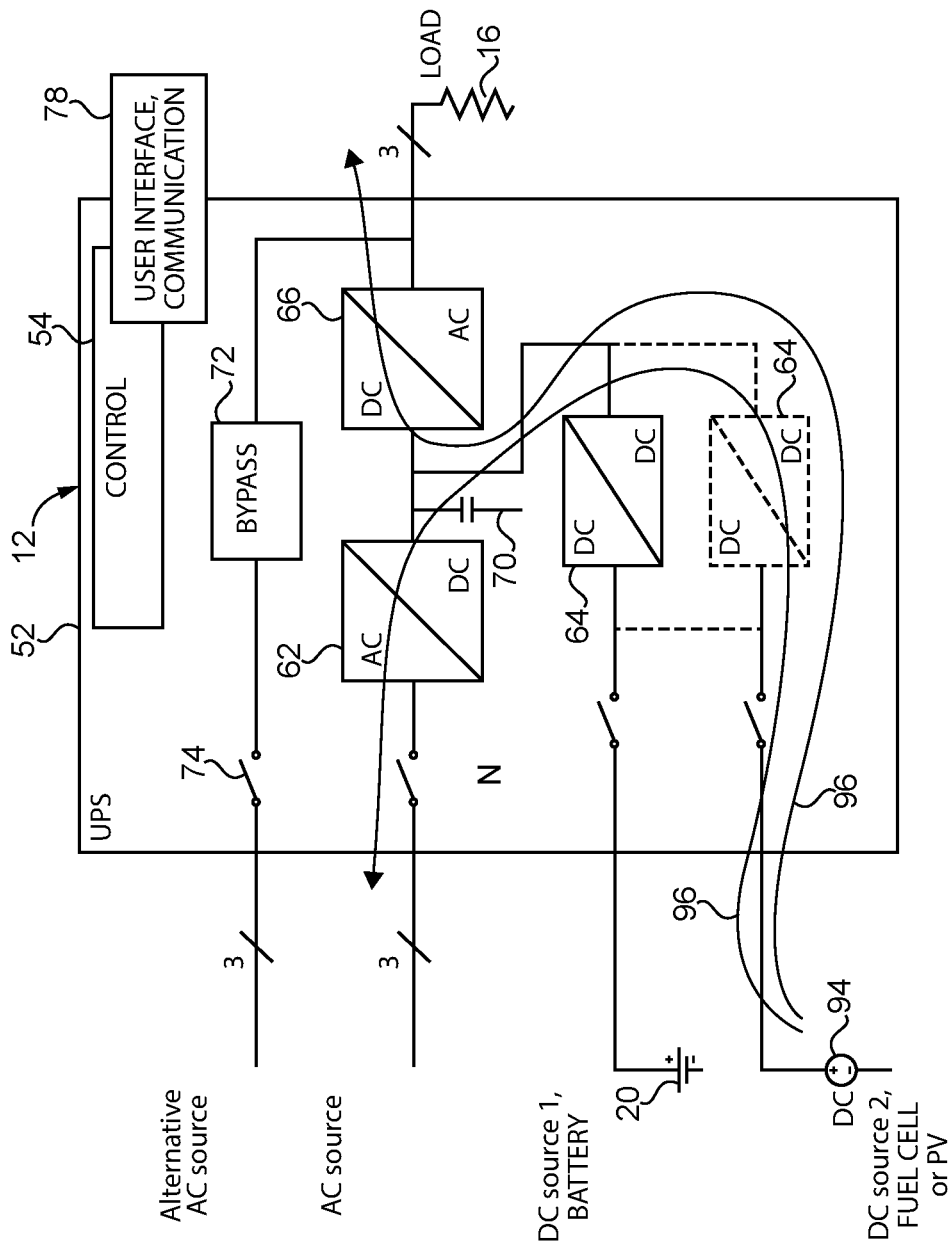
FIG. 9 shows the power installation according to the fifth embodiment with a power path providing power to the AC power source as a schematic view.

Based on the fifth embodiment, FIG. 9 indicates a further possible power flow through the power installation 10. Hence, in this example, the UPS system 12 is controlled to provide power from the fuel cell or photovoltaic power supply 94 to the AC power source 18, as indicated by power path 96. Hence, in case the load 16 requires less power than provided by the fuel cell or photovoltaic power supply 94, e.g. in case when sun conditions are very good, an excess of power can be used and will not be lost.

The assembly controller 24 further implements a control of the UPS system 12 and the controllable hardware components 34, 36 with a choice of power supply 18, 20, 94 according to a power installation efficiency optimization, a power source current Power Factor (PF), a power source quality, availability of regenerative power sources as secondary power supplies, and a user controlled preference of power supply.

Figure 10:
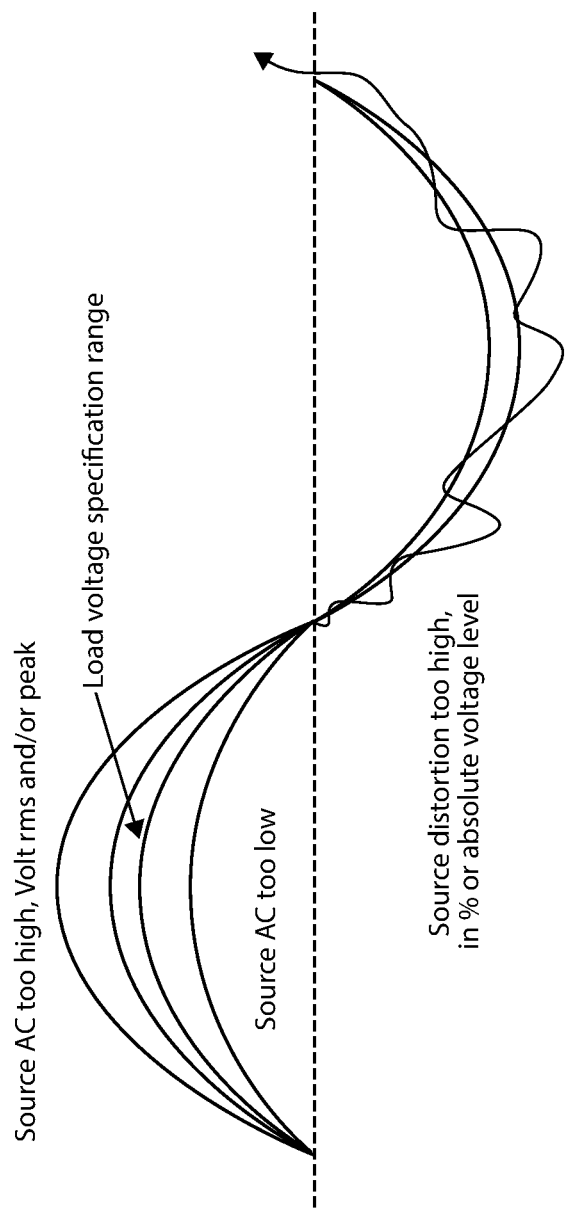
FIG. 10 shows a specified load voltage with a margin together with typical deviations from the specified load voltage.
Figure 11:
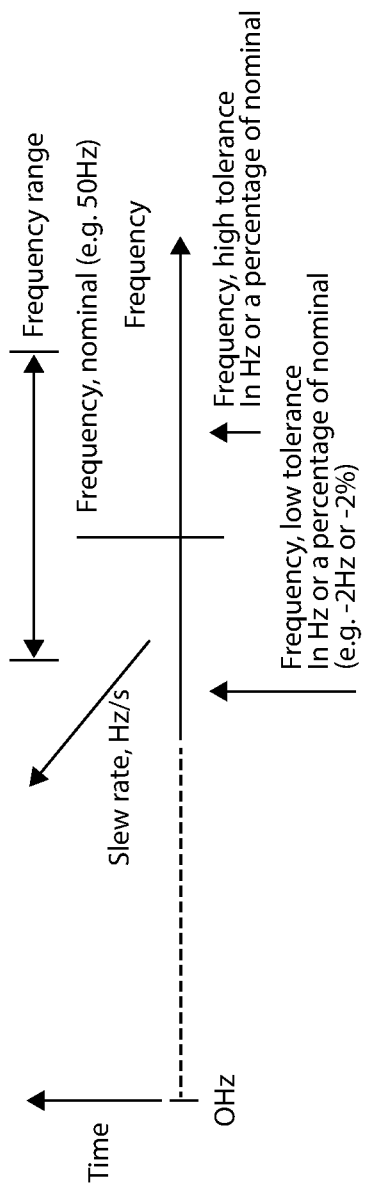
FIG. 11 shows different control parameters in respect to a load voltage frequency together in a schematic diagram.

Still further, the assembly controller 24 implements a control based on a specification of a load voltage, a load current and a load frequency with a margin, which can be set by an operator. FIG. 10 depicts a load voltage with a margin according to a specification and additionally a possible real load voltage in the case of problems. The assembly controller 24 performs a control of the uninterruptible power supply system 12 and the controllable hardware components 34, 36 based on these specifications and further parameters, as indicated in FIG. 11 in respect to a load voltage frequency.

Load power factor (PF) tolerance may include both a reactive current, inductive or capacitive, and a non-linear component in addition to resistive. Load 16 and utility current of the AC power source 18 and voltage envelopes and phase, kVA and kW, which are known for control, e.g. through existing current and voltage measurements. Capability to correct a current of the AC power source 18 for load PF depends on a balance of energy supplied to the load 16 through the AC power source 18 and inverter paths. This depends on the voltage difference between the AC power source 18 and the load 16 according to a specification. The bigger the difference, the larger the fraction of total power supplied by the AC/DC-converter 62c performing PF correction of the AC power source 18. Load 16 PF tolerance preferably comprises a simple table of allowed non-unity PF current from AC power source 18, with user selectable levels.

Figure 12:
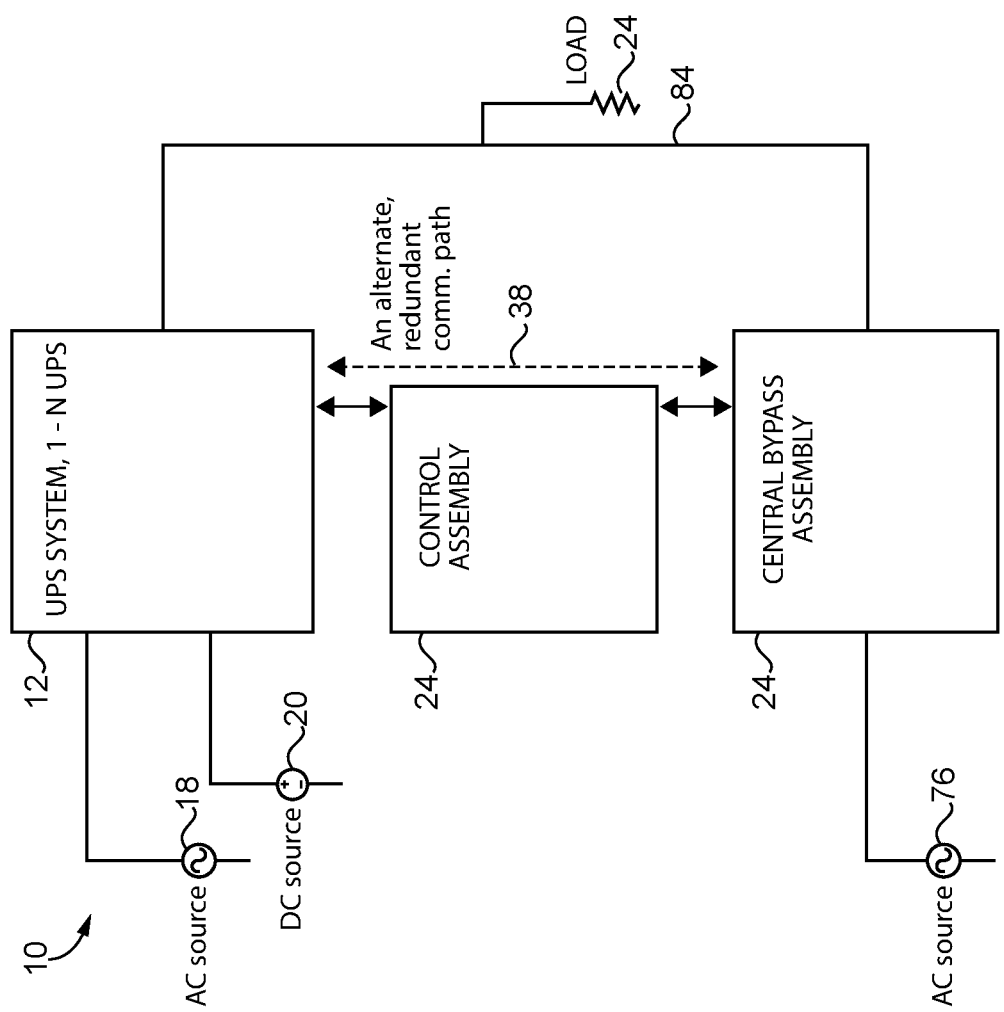
FIG. 12 shows a power installation according to a sixth embodiment as a schematic view.

FIG. 12 refer to a sixth embodiment of the present invention. A power installation 10 of the sixth embodiment is based on the power installation 10 of the first embodiment. Hence, the power installation comprises a UPS system 12, as specified above. Furthermore, the user installation comprises an independent assembly controller 24 controlling the UPS system 12 and the controllable hardware components 34, 36. The independent assembly controller 24 is provided as a master for other assembly controllers 24.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 10 power installation
12 uninterruptible power supply system, UPS system
14 user installation
16 load
18 AC power source, primary power supply
20 battery, secondary power supply
22 installation control assembly
24 assembly controller
25 arrow, measurement signals received
26 measurement device
27 probe
28 control input
30 control output
32 controller
34 switch, controllable hardware component
36 fan, controllable hardware component
37 arrow, control of the controllable hardware components
38 communication link
40 galvanic separation transformer
42 user interface
44 shunt
46 non-volatile memory
50 transformer
52 uninterruptible power supply module, UPS module
54 control device
56 arrow
58 UPS switch
60 arrow
62 AC/DC converter, rectifier
64 DC/DC converter
66 DC/AC converter, inverter
67 converter part
68 DC link
70 storage capacitor
72 bypass connection
74 bypass switch
76 alternate AC power source
78 component
80 internal power source
82 isolation transformer
84 load side power bus
86 power supply side primary power bus
87 power supply secondary power bus
88 bypass power bus
90 control link
92 control unit
94 fuel cell or photovoltaic power supply, secondary power supply.
96 power path, arrow
98 installation control assembly system
PE protected earth
N neutral

The invention claimed is:

1. A power installation comprising an uninterruptible power supply system and a user installation, wherein the user installation comprises
   a load,
   at least one AC power source,
   at least one secondary power supply,
   at least one controllable hardware component, and
   a system Protective Earth,
the uninterruptible power supply system comprises
   at least one uninterruptible power supply module, and
   a control device for controlling the uninterruptible power supply system based on at least one system parameter of the uninterruptible power supply system,
   wherein the at least one uninterruptible power supply system is connected between the at least one AC power source, the at least one secondary power supply, and the load,
   at least one installation control
      assembly comprising
      an assembly controller, and
      at least one measurement device connected to the assembly controller,
   wherein
   the installation control assembly is galvanically referenced to system Protective Earth, and
   the assembly controller performs a control of the uninterruptible power supply system and the at least one controllable hardware component based on measurement signals received from the at least one measurement device.

2. The power installation according to claim 1, wherein the installation control assembly comprises at least one out of a control input and a control output for receiving control signals and for transmitting control signals, respectively.

3. The power installation according to claim 1, wherein the control inputs and control outputs are isolated, non-isolated or a combination thereof.

4. The power installation according to claim 1, wherein the at least one measurement device is a measurement device for at least one out of voltage, current, temperature, mass flow or others.

5. The power installation according to claim 1, wherein
the power installation comprises multiple installation control assemblies forming an installation control assembly system,
wherein
the assembly controllers of the installation control assembly system perform a common control of the uninterruptible power supply system and the at least one controllable hardware component.

6. The power installation according to claim 5, wherein
the assembly controllers of the installation control assembly system operate on a master/slave or a distributed and redundant control architecture.

7. The power installation according to claim 5, wherein
the installation control assembly system comprises an independent assembly controller controlling the uninterruptible power supply system and the at least one controllable hardware component.

8. The power installation according to claim 1, wherein
the assembly controller performs a control of the uninterruptible power supply system and the at least one controllable hardware component, with a choice of power source according to a defined preference.

9. The power installation according to claim 8, wherein
the assembly controller implements a control of the uninterruptible power supply system and the at least one controllable hardware component with a choice of power source according to at least one out of
power installation efficiency optimization,
power source current Power Factor (PF),
power source quality,
availability of regenerative power sources as secondary power supplies, and
a user controlled preference of power sources.

10. The power installation according to claim 1, wherein
the installation control assembly implements a control, communication and measurement capability for the uninterruptible power supply system beyond the inherent control capability of the uninterruptible power supply system.

11. The power installation according to claim 1, wherein
the load comprises a specification of at least one out of a load voltage, a load current and a load frequency, whereby the assembly controller performs a control of the uninterruptible power supply system and the at least one controllable hardware component based on the specification of at least one out of a load voltage, a load current and a load frequency.

12. The power installation according to claim 1, wherein
the at least one controllable hardware component comprises at least one out of
a switch gear,
components for thermal management, in particular of the uninterruptible power supply system,
an additionally isolated control interface, and
self-contained assemblies in communication with the uninterruptible power supply system.

13. The power installation according to claim 1, wherein
at least one out of the installation control assembly, the control device, and a communication system for communication of the installation control assembly and the control device comprises a user interface enabling safe access by a system operator.

14. The power installation according to claim 1, wherein
the uninterruptible power supply system comprises multiple uninterruptible power supply modules, which are connected in parallel within the uninterruptible power supply system.

15. The power installation according to preceding claim 14, wherein
each uninterruptible power supply module comprises a control unit, whereby
the control units are in communication with each other, and
at least one out of the control units implements the control device of the uninterruptible power supply system and commonly controls the multiple uninterruptible power supply modules.

16. The power installation according to claim 2, wherein the control inputs and control outputs are isolated, non-isolated or a combination thereof.

17. The power installation according to claim 2, wherein the at least one measurement device is a measurement device for at least one out of voltage, current, temperature, mass flow or others.

18. The power installation according to claim 3, wherein the at least one measurement device is a measurement device for at least one out of voltage, current, temperature, mass flow or others.

19. The power installation according to claim 2, wherein the power installation comprises multiple installation control assemblies forming an installation control assembly system, and
wherein the assembly controllers of the installation control assembly system perform a common control of the uninterruptible power supply system and the at least one controllable hardware component.

20. The power installation according to claim 3, wherein the power installation comprises multiple installation control assemblies forming an installation control assembly system, and
wherein the assembly controllers of the installation control assembly system perform a common control of the uninterruptible power supply system and the at least one controllable hardware component.

* * * * *